US009690969B2

(12) United States Patent
Okamoto

(10) Patent No.: US 9,690,969 B2
(45) Date of Patent: Jun. 27, 2017

(54) INFORMATION PROCESSING APPARATUS, NON-TRANSITORY COMPUTER READABLE MEDIUM, AND INFORMATION PROCESSING METHOD

(71) Applicant: FUJI XEROX CO., LTD., Tokyo (JP)

(72) Inventor: Hiroshi Okamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 233 days.

(21) Appl. No.: 14/722,781

(22) Filed: May 27, 2015

(65) Prior Publication Data

US 2016/0028850 A1    Jan. 28, 2016

(30) Foreign Application Priority Data

Jul. 25, 2014   (JP) .................... 2014-151512

(51) Int. Cl.
*G06F 15/16*   (2006.01)
*G06K 9/00*    (2006.01)
*H04L 29/08*   (2006.01)

(52) U.S. Cl.
CPC .............. *G06K 9/00* (2013.01); *H04L 67/327* (2013.01)

(58) Field of Classification Search
CPC ................................. G06K 9/00; H04L 67/327
See application file for complete search history.

(56) References Cited

U.S. PATENT DOCUMENTS 8,621,070 B1 * 12/2013 Venneti ............... H04L 43/00
709/223
9,577,774 B2 * 2/2017 Zhang ............... H04J 3/0641
2014/0136698 A1 * 5/2014 Venneti ............... H04L 43/00
709/224
2016/0013876 A1 * 1/2016 Zhang ............... H04J 3/0667
370/350

FOREIGN PATENT DOCUMENTS

| JP | 2006-004439 A | 1/2006 |
|----|---------------|--------|
| JP | 2006-331292 A | 12/2006 |
| JP | 2007-287046 A | 11/2007 |
| JP | 2012-133522 A | 7/2012 |

* cited by examiner

*Primary Examiner* — Moustafa M Meky
(74) *Attorney, Agent, or Firm* — Oliff PLC

(57) ABSTRACT

An information processing apparatus includes an acquiring unit and a classification-proportion calculating unit. The acquiring unit acquires a granularity and network information that includes multiple nodes and multiple links connecting the multiple nodes, the granularity being used to classify the multiple nodes into multiple components. The classification-proportion calculating unit calculates a classification proportion in which each of the multiple nodes is classified as one of the components. The classification-proportion calculating unit calculates the classification proportion for each of the multiple components by using values of a first contribution and a second contribution. The first contribution takes on a high value as the classification proportion becomes high in which one of the nodes having a corresponding one of the links is classified as the component. The second contribution takes on a high value as a proportion of the component to the multiple components becomes high.

10 Claims, 7 Drawing Sheets

$$T = \begin{pmatrix} 0 & 1/3 & 0 & 1/4 & 0 & 0 & 0 \\ 1/2 & 0 & 1/2 & 1/4 & 0 & 0 & 0 \\ 0 & 1/3 & 0 & 1/4 & 0 & 0 & 0 \\ 1/2 & 1/3 & 1/2 & 0 & 1/3 & 0 & 0 \\ 0 & 0 & 0 & 1/4 & 0 & 1/2 & 1/2 \\ 0 & 0 & 0 & 0 & 1/3 & 0 & 1/2 \\ 0 & 0 & 0 & 0 & 1/3 & 1/2 & 0 \end{pmatrix}$$

FIG. 4

| p(n \| k) | | |
|---|---|---|
| | k = 1 | k = 2 |
| n = 1 | 0.25 | 0.03 |
| n = 2 | 0.25 | 0.03 |
| n = 3 | 0.25 | 0.03 |
| n = 4 | 0.15 | 0.11 |
| n = 5 | 0.05 | 0.2 |
| n = 6 | 0.025 | 0.3 |
| n = 7 | 0.025 | 0.3 |

| π(k) | |
|---|---|
| k = 1 | 0.6 |
| k = 2 | 0.4 |

FIG. 5

| q(k \| n) | | | | | | | |
|---|---|---|---|---|---|---|---|
| | n = 1 | n = 2 | n = 3 | n = 4 | n = 5 | n = 6 | n = 7 |
| k = 1 | 0.93 | 0.93 | 0.93 | 0.67 | 0.27 | 0.11 | 0.11 |
| k = 2 | 0.07 | 0.07 | 0.07 | 0.33 | 0.73 | 0.89 | 0.89 |

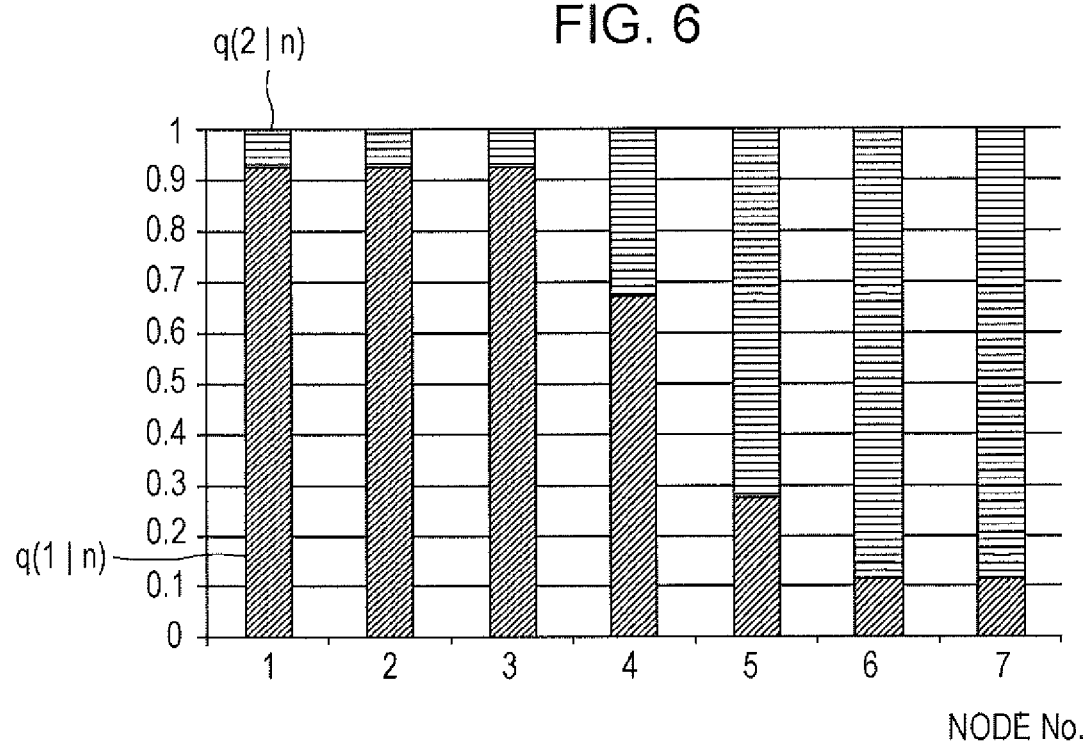

US 9,690,969 B2

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2014-151512 filed Jul. 25, 2014.

BACKGROUND (i) Technical Field

The present invention relates to an information processing apparatus, a non-transitory computer readable medium, and an information processing method.

(ii) Related Art

To date, so-called clustering has been sometimes performed in order to grasp global characteristics of vector data such as a set of data points. The clustering that is a data-point classification technique includes hard clustering in which one data point belongs to one cluster and soft clustering in which one data point belongs to multiple clusters.

SUMMARY

According to an aspect of the invention, there is provided an information processing apparatus including an acquiring unit and a classification-proportion calculating unit. The acquiring unit acquires a granularity and network information that includes multiple nodes and multiple links connecting the multiple nodes, the granularity being used to classify the multiple nodes into multiple components. The classification-proportion calculating unit calculates a classification proportion in which each of the multiple nodes is classified as one of the components. The classification-proportion calculating unit calculates the classification proportion for each of the multiple components by using values of a first contribution and a second contribution. The first contribution takes on a high value as the classification proportion becomes high in which one of the nodes having a corresponding one of the links is classified as the component. The second contribution takes on a high value as a proportion of the component to the multiple components becomes high.

BRIEF DESCRIPTION OF THE DRAWINGS

An exemplary embodiment of the present invention will be described in detail based on the following figures, wherein:

FIG. 4 is a chart illustrating a classification proportion and a degree of importance calculated by the information processing apparatus according to the exemplary embodiment of the invention;

FIG. 5 is a chart illustrating a degree of belonging calculated by the information processing apparatus according to the exemplary embodiment of the invention;

FIG. 6 is a graph representing degrees of belonging of nodes calculated by the information processing apparatus according to the exemplary embodiment of the invention;

FIG. 7 is a chart illustrating an acquired interest vector and a calculated personalized ranking in the information processing apparatus according to the exemplary embodiment of the invention;

DETAILED DESCRIPTION

Hereinafter, an exemplary embodiment of the invention will be described with reference to the drawings.

Figure 1:
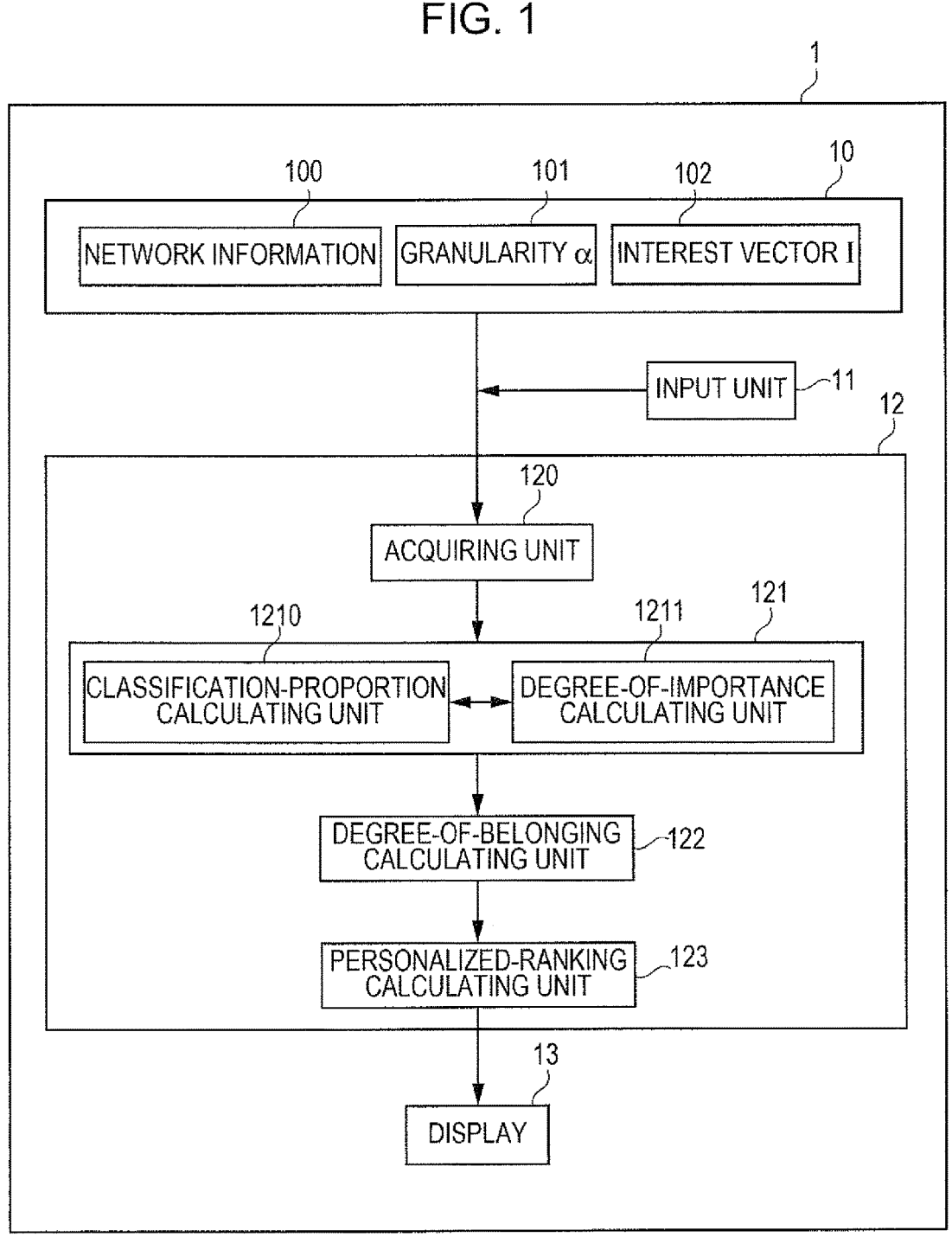
FIG. 1 is a diagram of a configuration of an information processing apparatus according to the exemplary embodiment of the invention.

FIG. 1 is a diagram of a configuration of an information processing apparatus 1 according to the exemplary embodiment of the invention. The information processing apparatus 1 includes a memory 10, an input unit 11, a controller 12, and a display 13.

The memory 10 includes, for example, a random access memory (RAM) and a read only memory (ROM). The memory 10 is used to store a program executed by the controller 12 and also functions as a work memory of the controller 12. Note that the program executed by the controller 12 and stored in the memory 10 may be provided through a telecommunication network or through a computer readable information storage medium, such as a semiconductor memory, storing the program therein.

The memory 10 of the information processing apparatus 1 according to the present exemplary embodiment is used to store network information 100, a granularity $\alpha$ 101, and an interest vector I 102. The network information 100 is network information including multiple nodes and multiple links connecting the multiple nodes. The network information 100 may be, for example, HTML data and friendship data including cross reference. The network information 100 may at least represent a linkage relationship between nodes (relationship between nodes and links) and does not have to specifically represent the content of each node (such as the content of HTML data).

The granularity $\alpha$ 101 is expressed by using a positive real number and is a parameter for determining the size of a cluster in soft clustering performed on the network information 100 by the information processing apparatus 1. The interest vector I 102 is a vector with the same number of dimensions as the number of nodes included in the network information 100. Elements of the interest vector I 102 are each expressed by using a positive real number, and the total sum of the real numbers of the elements is 1. The interest vector I 102 is used to calculate personalized rankings of the nodes.

The input unit 11 is, for example, a keyboard or a mouse and transfers an instruction from a user to the controller 12. The granularity $\alpha$ 101 and the interest vector I 102 have been stored in the memory 10 in the present exemplary embodiment, but may be input by the user by using the input unit 11.

The controller 12 includes, for example, a central processing unit (CPU) and executes the program stored in the memory 10 to thereby perform overall control over the information processing apparatus 1. The controller 12 includes an acquiring unit 120, a calculating unit 121, a degree-of-belonging calculating unit 122, and a personalized-ranking calculating unit 123 in a functional configuration. The calculating unit 121 includes a classification-proportion calculating unit 1210 and a degree-of-importance calculating unit 1211. The control performed by the controller 12 will be described in detail later.

The display 13 presents information processed by the controller 12 to the user and is, for example, a liquid crystal display.

Figure 2:
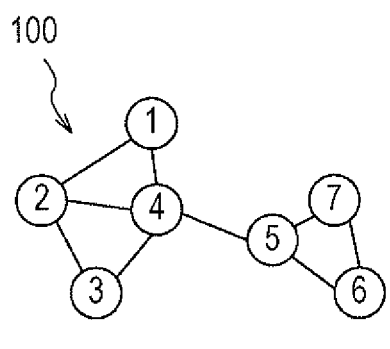
FIG. 2 is a diagram illustrating network information.

FIG. 2 is a diagram illustrating the network information 100. The network information 100 includes information regarding seven nodes and nine links in the present exemplary embodiment. The nodes are respectively assigned node numbers of 1 to 7. For example, the node assigned node No. 1 (hereinafter, the node [1]) has links with the node [2] and the node [4], respectively. The present exemplary embodiment describes the case of the network having the seven nodes for simplicity, but the number of nodes and the number of links may be more than these and may be, for example, about 100,000. In the present exemplary embodiment, each link between the nodes is not a directed link, but may be a one-way link.

A matrix T represents transition probabilities in the case of random transitions between the nodes through the links. For example, in a case of a random transition from the node [1] to another node through a link, probabilities of the transitions to the node [2] and the node [4] are ½ and ½, respectively. A first column of the matrix T represents the transition probabilities of these transitions. The other elements of the matrix T are also arranged in the same manner. Suppose a case where a matrix A is used in which $A_{nm}=1$ holds true in the presence of a linkage between a node [n] and a node [m] through a link and in which $A_{nm}=0$ holds true in the absence of the linkage, and where the total number of nodes is N. In this case, the matrix T is generally defined in accordance with Formula (1) below. Since the total sum of the transition probabilities is 1, $\Sigma_n T_{nm}=1$ holds true for any node [m].

$$T_{nm} = \frac{A_{nm}}{\sum_{s=1}^{N} A_{sm}} \quad (1)$$

Figure 3:
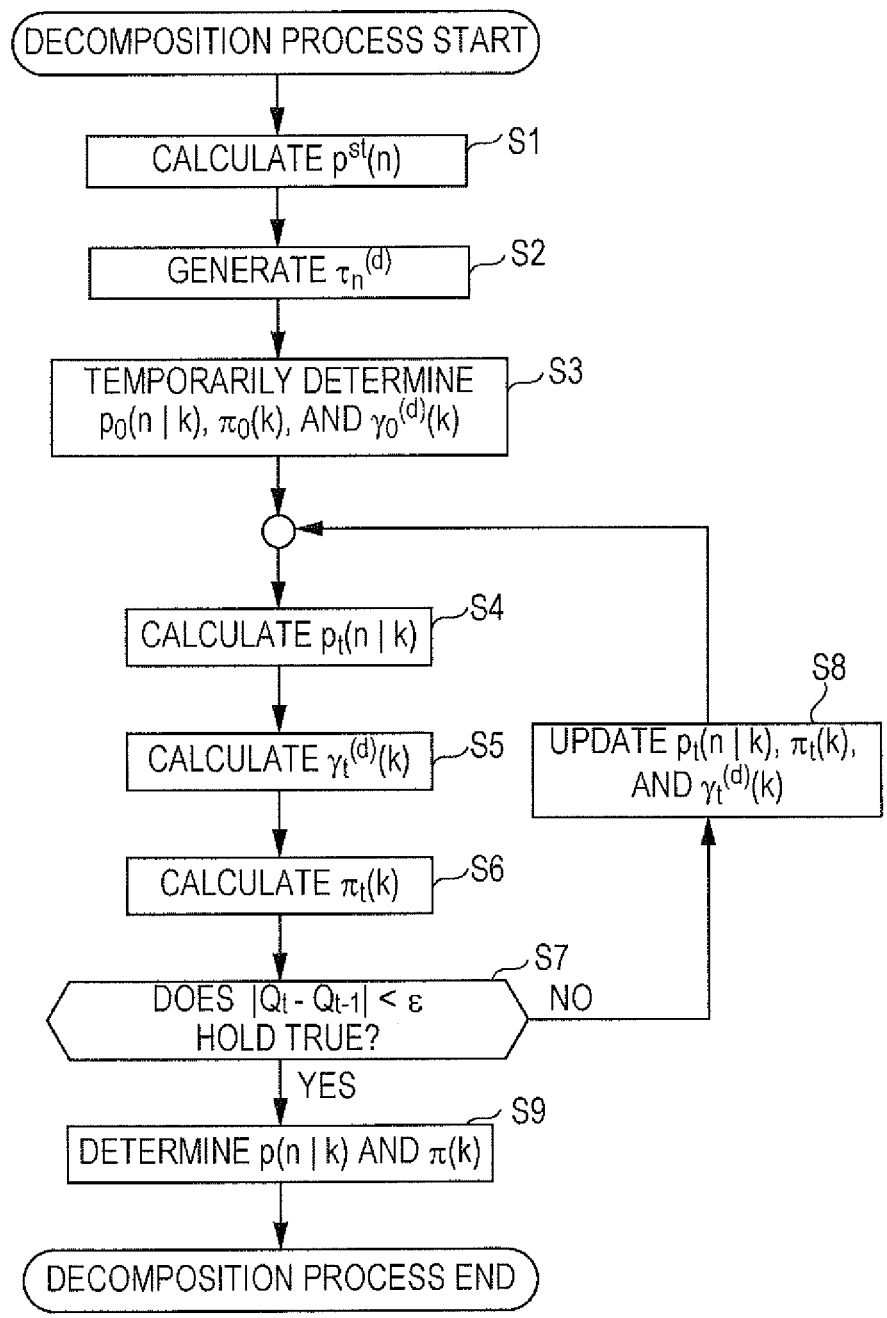
FIG. 3 is a flowchart of a decomposition process executed by the information processing apparatus according to the exemplary embodiment of the invention.

FIG. 3 is a flowchart of a decomposition process executed by the information processing apparatus 1 according to the exemplary embodiment of the invention. In the decomposition process, the network information 100 and the granularity α 101 are input, and then soft clustering is performed on a network by classifying the N nodes included in the network into K components. Note that N and K are positive integers. A total number K of components is a parameter that the user may temporarily determine, while the total number of clusters is automatically determined by executing the decomposition process. In the decomposition process, a classification proportion in which each of multiple nodes is classified as one of the multiple components is obtained for each of the multiple components, and a degree of importance of each component is obtained. Specifically, for a component [k], a classification proportion p(n|k) in which the node [n] is classified as the component [k] is obtained, and a degree of importance π(k) of the component [k] is obtained. When the classification proportion p(n|k) and the degree of importance π(k) are obtained, a proportion $\gamma^{(d)}(k)$ representing a proportion of the component [k] to the total components is obtained, the proportion $\gamma^{(d)}(k)$ being calculated on the basis of the d-th transit information $\tau^{(d)}$. The d-th transit information $\tau^{(d)}$ is an N-dimensional vector, and has D pieces of data that are $\tau^{(1)}, \tau^{(2)}, \ldots \tau^{(D)}$ (D is a positive integer).

In the decomposition process, a stationary probability distribution $p^{st}(n)$ is first calculated, the stationary probability distribution $p^{st}(n)$ being observed in the case of random transitions among the nodes of the network represented by the network information 100 (S1). The stationary probability distribution $p^{st}(n)$ is obtained by simultaneous N-th degree equations defined by Formula (2) below. The stationary probability distribution $p^{st}(n)$ is an eigenvector of the matrix T and has an eigenvalue of 1.

$$p^{st}(n) = \sum_{m=1}^{N} T_{nm} p^{st}(m) \quad (2)$$

In a case of a network having one-way links, for example, a so-called rank sink occurs, and only a node in specific stationary probability distribution might have a value. In such a case, Formula (2) may be transformed to have, for example, a relation of $p^{st}(n)=(1-r)\Sigma_m T_{nm} p^{st}(m)+r$. The stationary probability distribution $p^{st}(n)$ may be obtained in accordance with the relation. Note that r is a real number from 0 to 1 inclusive and represents a probability of a random transition between nodes without passing through a link.

Next, multiple transit information pieces $\tau_n^{(d)}$ representing transit nodes in random transitions between the multiple nodes through the multiple links are generated (S2). In the present exemplary embodiment, the transit information pieces $\tau_n^{(d)}$ are generated on the basis of $\tau_n^{(d)}=1$ defined for the node [n] and $\tau_m^{(d)}=1$ defined for the node [m], the node [n] being selected in accordance with the stationary probability distribution $p^{st}(n)$, the node [m] being selected in accordance with $T_n$, denoting a probability of a transition from the node [n] to the node [m]. Such an N-dimensional vector is generated D times. The transit information pieces $\tau_n^{(d)}$ is provided as an amount satisfying $\Sigma_n t_n^{(d)}=2$. The transit information pieces $\tau_n^{(d)}$ are provided on the assumption that a virtual agent is found on a link between the node [n] and the node [m] when the virtual agent randomly transitions between nodes through links.

The classification-proportion calculating unit 1210 and the degree-of-importance calculating unit 1211 according to the present exemplary embodiment respectively calculate the classification proportion p(n|k) and the degree of importance π(k) through sequential computation. In the decomposition process, $p_0(n|k)$, $\pi_0(k)$, and $\gamma_0^{(d)}(k)$ are temporarily determined before the sequential computation is started (S3). Values satisfying $\Sigma_n p_0(n|k)=1$ and $\Sigma_k \pi_0(k)=1$ are provided. Since $p_0(n|k)$ denotes the possibility proportion in which a node denoted by n (n=1 to N) is classified as one of the components that is denoted by k (k=1 to K), positive real numbers the number of which is K×N−1 are provided in the temporary determination. Note that −1 is provided because of $\Sigma_n p_0(n|k)=1$. Since $\pi_0(k)$ denotes the degree of importance of a component denoted by k (k=1 to K) of the network, positive real numbers the number of which is K−1 are provided in the temporary determination. Since $\gamma_0^{(d)}(k)$ is a coefficient that represents a proportion of the component [k] to the total components and that is determined in accordance with the transit information $\tau^{(d)}$ (d=1 to D), positive real numbers the number of which is K×D are provided in the temporary determination.

A classification proportion $p_t(n|k)$ is first calculated in the sequential computation in a t-th sequential computation (S4). Note that t is expressed by using a positive integer and denotes the sequential computation count. The classification proportion $p_t(n|k)$ is calculated from $p_{t-1}(n|k)$, $\pi_{t-1}(k)$, and $\gamma_{t-1}^{(d)}(k)$ that are obtained in a sequential computation preceding the t-th sequential computation. For example, $p_1(n|k)$ is obtained by using $p_0(n|k)$, $\pi_0(k)$, and $\gamma_0^{(d)}(k)$ in the first sequential computation performed after the temporary determination (S3).

The classification-proportion calculating unit 1210 according to the present exemplary embodiment calculates the classification proportion $p_t(n|k)$ in the t-th sequential computation in accordance with the relation defined by using Formula (3) below (S4).

$$p_t(n|k) = \frac{\alpha}{\alpha + 2D_{t-1}(k)} \sum_{m=1}^{N} T_{nm} p_{t-1}(m|k) + \frac{1}{\alpha + 2D_{t-1}(k)} \sum_{d=1}^{D} \gamma_{t-1}^{(d)}(k) \tau_n^{(d)} \quad (3)$$

Note that α denotes the granularity α 101 stored in the memory 10 and is expressed by using a positive real number. In the present exemplary embodiment, the granularity α 101 is a parameter. The decomposition granularity becomes finer as α approaches 0. The decomposition granularity becomes coarser, as α approaches infinity. In addition, $D_{t-1}(k)$ is a coefficient determined in accordance with $\gamma_{t-1}^{(d)}(k)$, and $D_{t-1}(k) = \Sigma_d \gamma_{t-1}^{(d)}(k)$.

The classification proportion $p_t(n|k)$ is calculated from values of a first contribution (a first right side term) and a second contribution (a second right side term). The value of the first contribution becomes high as a classification proportion $p_{t-1}(m|k)$ becomes high in which a node (node [m] with $T_{nm} \neq 0$) having a link with the node [n] is classified as the component [k]. The value of the second contribution becomes high as a proportion $\gamma_{t-1}^{(d)}(k)$ of the component [k] to the total components becomes high.

The first contribution is defined from a first coefficient $\alpha/(\alpha+2D_{t-1}(k))$ and the preceding classification proportion $p_{t-1}(m|k)$ calculated for the node (node [m] with $T_{nm} \neq 0$) having the link with the node [n]). The first coefficient $\alpha/(\alpha+2D_{t-1}(k))$ approaches 1 as the granularity α 101 is made coarser (as α is made closer to infinity). The second contribution is defined from a second coefficient $1/(\alpha+2D_{t-1}(k))$, the multiple transit information pieces $\tau_n^{(d)}$, and the proportion $\gamma_n^{(d)}(k)$ of the component [k] to the total components. The second coefficient $1/(\alpha+2D_{t-1}(k))$ approaches 0 as the granularity α 101 is made coarser (as α is made closer to infinity). As to be described below, the proportion $\gamma_{t-1}^{(d)}(k)$ of the component [k] to the total components is calculated from the classification proportion $P_{t-1}(n|k)$ and the degree of importance $\pi_{t-1}(k)$ that are obtained in the preceding calculation.

Next, the proportion $\gamma_t^{(d)}(k)$ of the component [k] to the total components is calculated from the classification proportion $p_{t-1}(n|k)$, the degree of importance $\pi_{t-1}(k)$, and the multiple transit information pieces $\tau_n^{(d)}$ (S5), the classification proportion $p_{t-1}(n|k)$ and the degree of importance $\pi_{t-1}(k)$ being obtained in the preceding calculation. In the present exemplary embodiment, the proportion $\gamma_t^{(d)}(k)$ is calculated in accordance with Formula (4) below. A component having a relatively high degree of importance among the components takes on a high value of the proportion $\gamma_t^{(d)}(k)$.

$$\gamma_t^{(d)}(k) = \frac{\pi_{t-1}(k) \prod_{n=1}^{N} (p_{t-1}(n|k))^{\tau_n^{(d)}}}{\sum_{j=1}^{K} \left( \pi_{t-1}(j) \prod_{m=1}^{N} (p_{t-1}(m|j))^{\tau_m^{(d)}} \right)} \quad (4)$$

Further, the degree of importance $\pi_t(k)$ of the component [k] of the network is calculated (S6). The degree of importance $\pi_t(k)$ is calculated in such a manner as to take on a high value as the proportion $\gamma_t^{(d)}(k)$ of the component [k] to the total components becomes high. In the present exemplary embodiment, the degree of importance $\pi_t(k)$ of the component [k] is calculated in accordance with Formula (5) below.

$$\pi_t(k) = \frac{D_{t-1}(k)}{\sum_{j=1}^{K} D_{t-1}(j)}, \quad (5)$$

$$D_{t-1}(k) = \sum_{d=1}^{D} \gamma_{t-1}^{(d)}(k)$$

In accordance with Formulas (3), (4), and (5) above, the classification proportion $p_t(n|k)$, the degree of importance $\pi_t(k)$, and the proportion $\gamma_t^{(d)}(k)$ are calculated from the classification proportion $p_{t-1}(n|k)$, the degree of importance $\pi_{t-1}(k)$, the proportion $\gamma_{t-1}^{(d)}(k)$, and the transit information pieces $\tau_n^{(d)}$, the classification proportion $p_{t-1}(n|k)$, the degree of importance $\pi_{t-1}(k)$, and the proportion $\gamma_{t-1}^{(d)}(k)$ being obtained in the preceding calculation.

In the decomposition process, the calculating unit 121 determines whether an absolute value $|Q_t - Q_{t-1}|$ of a difference between an evaluation value $Q_{t-1}$ before the most recent sequential computation and an evaluation value $Q_t$ after the sequential computation is smaller than a predetermined reference value ε and thereby determines whether to terminate the sequential computation (S7). In the present exemplary embodiment, the evaluation value $Q_t$ is defined in accordance with Formula (6) below.

$$Q_t = \sum_{k=1}^{K} \sum_{d=1}^{D} \gamma_t^{(d)}(k) \log(\pi_t(k)) + \quad (6)$$

$$\sum_{k=1}^{K} \sum_{n=1}^{N} \left( \sum_{d=1}^{D} \gamma_t^{(d)}(k) \tau_n^{(d)} + \alpha \sum_{m=1}^{N} T_{nm} p_t(m|k) \right) \log(p_t(n|k))$$

If $|Q_t - Q_{t-1}| < \epsilon$ does not hold true, the classification proportion $p_t(n|k)$, the degree of importance $\pi_t(k)$, and the proportion $\gamma_t^{(d)}(k)$ that are the most recent are updated as the preceding classification proportion, the preceding degree of importance, and the preceding proportion (S8). Thereafter, a series of steps is repeated, that is, calculating the classification proportion $p_{t+1}(n|k)$ (S4), calculating the proportion $\gamma_{t+1}^{(d)}(k)$ (S5), calculating the degree of importance $\pi_{t+1}(k)$ (S6), and determining whether $|Q_{t+1} - Q_t| < \epsilon$ holds true (S7). The classification-proportion calculating unit 1210 and the degree-of-importance calculating unit 1211 according to the present exemplary embodiment repeat the aforementioned steps until the absolute value of the evaluation value difference becomes lower than the predetermined value, thus calculating the classification proportion and the degree of importance through the sequential computations. This leads to the soft clustering asymptotically performed on the network information 100.

If $|Q_t-Q_{t-1}|<\epsilon$ holds true, the classification proportion in which the node [n] is classified as the component [k] and the degree of importance of the component [k] are determined in accordance with $p(n|k)=p_t(n|k)$ and $\pi(k)=\pi_t(k)$, respectively (S9). With the information processing apparatus 1 according to the present exemplary embodiment, adjustment of the predetermined value $\epsilon$ enables the classification proportion $p(n|k)$ and the degree of importance $\pi(k)$ to be obtained with any accuracy, thus enabling the soft clustering to be performed on the network with any accuracy. Note that the number of times sequential computation is performed may be specified in advance. Values of $p_t(n|k)$ and $\pi_t(k)$ obtained after the predetermined number of times of the sequential computation may be determined as the classification proportion $p(n|k)$ and the degree of importance $\pi(k)$, respectively.

FIG. 4 is a chart illustrating a classification proportion and a degree of importance calculated by the information processing apparatus 1 according to the exemplary embodiment of the invention. FIG. 4 illustrates the classification proportion and the degree of importance calculated by the classification-proportion calculating unit 1210 and the degree-of-importance calculating unit 1211 according to the present exemplary embodiment after the network information 100 in FIG. 2 and the granularity $\alpha$ 101 are input. In the network information 100 according to the present exemplary embodiment, the number of nodes is 7 (N=7), and the calculated number of components is 2 (K=2). The number K of components is a parameter the user is allowed to temporarily determine in advance. However, if a sufficiently high value is set as K, a component k with $\pi(k)<\epsilon$ appears. In the soft clustering performed on the network information 100, the component k satisfying $\pi(k)<\epsilon$ is considered to have a degree of importance of 0 (the component k is not found). Note that a sufficiently high value as K means a value approximately equal to or higher than the number N of nodes. In other words, in the present exemplary embodiment, setting a sufficiently high value as K means setting of K≥7. As a result of the sequential computations performed by using a condition of, for example, K=7 by the classification-proportion calculating unit 1210 and the degree-of-importance calculating unit 1211 according to the present exemplary embodiment, five components have degrees of importance with $\pi(k)<\epsilon$, and two components have degrees of importance with $\pi(1)=0.6$ and $\pi(2)=0.4$, respectively. Accordingly, it is said that the network information 100 in the present exemplary embodiment has been classified into two components in the soft clustering. As to be described later, the number of components into which the network information 100 is classified depends on the size of the granularity $\alpha$ 101.

As it is understood from Formula (3), the classification proportion $p(n|k)$ of any component k is provided as an amount satisfying $\Sigma_n p(n|k)=1$. Suppose a case where a first component (k=1) is taken as an example and classification proportions in which the multiple nodes are classified as the component [1] are checked. The results are p(1|1)=0.25, p(2|1)=0.25, p(3|1)=0.25, p(4|1)=0.15, p(5|1)=0.05, p(6|1)=0.025, and p(7|1)=0.025. Accordingly, the classification proportions in which the nodes [1], [2], and [3] are classified as the component [1] are each ¼. In contrast, the classification proportion in which the node [4] is classified as the component [1] is 0.15, and thus is slightly lower than the aforementioned values. The classification proportion in which the node [5] is classified as the component [1] is 0.05, and the classification proportions in which the nodes [6] and [7] are classified as the component [1] are each 0.025. These values are much lower than the others.

Also suppose a case where the classification proportions in which the multiple nodes are classified as a component [2] are checked. The classification proportions in which the nodes [1], [2], and [3] are classified as the component [2] are each 0.03 and are much lower than the others. The classification proportion in which the node [4] is classified as the component [2] is 0.11 and slightly lower than other nodes. The classification proportion in which the node [5] is classified as the component [2] is 0.2, and the classification proportions in which the nodes [6] and [7] are classified as the component [2] are each 0.3.

As being expected from the structure of the network information 100 illustrated in FIG. 2, the information processing apparatus 1 according to the present exemplary embodiment classifies a group of the nodes [1], [2], and [3] and a group of the nodes [5], [6], and [7] as respective different components. The node [4] is an intermediate node, and the classification proportions in which the node [4] is classified as the component [1] and the component [2] are approximately the same. Nevertheless, the classification proportions in which the nodes [1], [2], and [3] are classified as the component [2] are not 0, and the classification proportions in which the nodes [5], [6], and [7] are classified as the component [1] are not 0, either. Calculating the classification proportions in such a manner enables nodes in a network to be classified as belonging to multiple components, thus enabling the soft clustering to be performed on the network.

The degree of importance $\pi(k)$ is provided as an amount satisfying $\Sigma_k \pi(k)=1$. The degree of importance $\pi(k)$ represents a degree of importance of the component [k] relative to the entire network. The degree of importance of the component [k] is determined, depending on the number of nodes classified as the component [k]. Among the classification proportions obtained in the present exemplary embodiment, the nodes [1], [2], and [3] particularly have the high classification proportions regarding the component [1], the nodes [5], [6], and [7] particularly have the high classification proportions regarding the component [2], and the node [4] has the higher classification proportion in which the node [4] is classified as the component [1] than the classification proportion in which the node [4] is classified as the component [2]. Accordingly, there are more nodes classified as the component [1] than nodes classified as the component [2], thus resulting in $\pi(1)>\pi(2)$.

FIG. 5 is a chart illustrating a degree of belonging calculated by the information processing apparatus 1 according to the exemplary embodiment of the invention. The degree of belonging is provided as an amount calculated by the degree-of-belonging calculating unit 122 and is calculated for each of the multiple nodes in such a manner as to take on a high value as the classification proportion $p(n|k)$ becomes high in which the node [n] is classified as the component [k]. In the present exemplary embodiment, a degree of belonging $q(k|n)$ of the node [n] belonging to the component [k] is obtained in accordance with Formula (7) below.

$$q(k|n) = \frac{\pi(k)p(n|k)}{\sum_{j=1}^{K} \pi(j)p(n|j)} \quad (7)$$

As it is understood from Formula (7), the degree of belonging q(k|n) satisfies $\Sigma_k q(k|n)=1$. In other words, the total sum of degrees of belonging of a certain node that belongs to multiple components is 1. The degree of belonging q(k|n) is an amount, relative to the total components, measured as a degree of belonging of a certain node [n] to the component [k].

FIG. 6 is a graph representing the degree of belonging of each node calculated by the information processing apparatus 1 according to the exemplary embodiment of the invention. The horizontal axis of the graph represents node No., and the vertical axis represents the degree of belonging. For example, the degree of belonging of each of the nodes [1], [2], and [3] to the component [1] is q(1|1)=q(1|2)=q(1|3)= 0.93, and the degree of belonging to the component [2] is q(2|1)=q(2|2)=q(2|3)=0.07. Accordingly, the nodes [1], [2], and [3] are considered to have a relatively high degree of belonging to the component [1]. The node [4] has a degree of belonging to the component [1] of q(1|4)=0.67 and a degree of belonging to the component [2] of q(2|4)=0.33, and thus has a relatively high degree of belonging to the component [1]. However, the node [4] has the degree of belonging to the component [2] that is not ignorable, and thus may be considered to be an intermediate node. The node [5] is also an intermediate node and has a degree of belonging to the component [1] of q(1|5)=0.27 and a degree of belonging to the component [2] of q(2|5)=0.73. In contrast, the nodes [6] and [7] each have a degree of belonging to the component [1] of q(1|6)=q(1|7)=0.11 and a degree of belonging to the component [2] of q(2|6)=q(2|7)=0.89 and are each considered to have a relatively high degree of belonging to the component [2].

The information processing apparatus 1 according to the present exemplary embodiment assigns each node a calculated degree of belonging and performs indexing on the node. The degree of belonging q(k|n) assigned to the node [n] as an index is a K-dimensional vector and represents a characteristic of the node [n] by using real number values the number of which is K. The index may be said to express the content of the node that is compressed into the K-dimensional vector. The index may be used not only for calculating personalized rankings of the nodes (described below) but also for performing a node search. For example, in a case where a request to retrieve a node having a particular type of characteristic is received from a user, the information processing apparatus 1 extracts one or more network components included in the user's request and selects a node having a high degree of belonging to the extracted component, thus using the selected node as a retrieval result. Employing such a method enables nodes to be searched at a higher speed than in a case where the content of each node is directly searched.

FIG. 7 is a chart illustrating the acquired interest vector I 102 and a calculated personalized ranking in the information processing apparatus 1 according to the exemplary embodiment of the invention. The interest vector I 102 is a vector with the same number of dimensions as the total number N of nodes, has elements each expressed by using a positive real number, and is a normalized vector that satisfies $\Sigma_n I_n=1$. Each element has a value representing how much the user is interested in a corresponding one of the multiple nodes. The higher the value is, the more the user is interested in the node. The lower the value is, the less the user is interested in the node. For example, suppose a case where the multiple nodes are document data. In this case, each element of the interest vector I 102 may be determined, on the basis of words input by the user, in accordance with $I_n$=(the number of user input words included in the node [n])/$\Sigma_m$ (the number of user input words included in the node [m]).

FIG. 7 illustrates an example of the interest vector I 102 stored in the information processing apparatus 1 according to the present exemplary embodiment. The interest vector I 102 has $I_n=0$ (n=0 to 5), $I_6=0.8$, and $I_7=0.2$. The example of the interest vector I 102 in the present exemplary embodiment illustrates a state in which the user is highly interested in the node [6] in particular and slightly interested in the node [7].

The personalized-ranking calculating unit 123 calculates the personalized rankings of the multiple nodes by using the classification proportion p(n|k), the degree of importance π(k), the degree of belonging q(k|n), and the interest vector I 102. The classification proportion p(n|k), the degree of importance π(k), and the degree of belonging q(k|n) are respectively calculated by the classification-proportion calculating unit 1210, the degree-of-importance calculating unit 1211, and the degree-of-belonging calculating unit 122. The personalized-ranking calculating unit 123 calculates the personalized rankings based on the interest vector I 102 with respect to a component [k] that is one of the components to which a node [n] having a relatively high value of the interest vector I 102 belongs, the component [k] exhibiting a relatively high degree of belonging q(k|n). The calculation is performed such that node having a higher degree of belonging q(k|n) to the component [k] than the other nodes is ranked higher. Specifically, in the present exemplary embodiment, a node having a higher value of the element $I_n$ of the interest vector I 102 than other nodes is the node [6], and the node [6] has a higher degree of belonging to the component [2] than to the other component. The nodes [6] and [7] have a higher degree of belonging to the component [2] than other nodes, and the node [5] comes next.

In the present exemplary embodiment, a personalized ranking p(n|I), of a node [n], based on the interest vector I 102 is obtained in accordance with Formula (8) below.

$$p(n|I) = \frac{\sum_{k=1}^{K} p(n|k) \prod_{m=1}^{N} (q(k|m))^{I_m}}{\sum_{j=1}^{K} \prod_{r=1}^{N} (q(j|r))^{I_r}} \quad (8)$$

Figure 8:
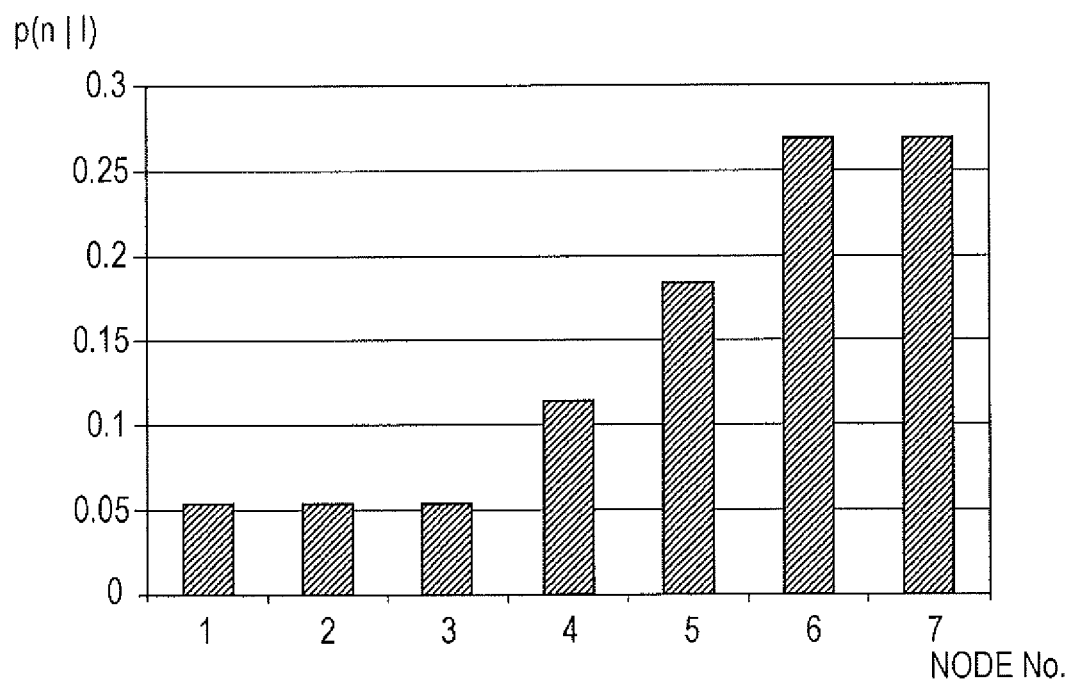
FIG. 8 is a graph representing the personalized ranking of each node calculated by the information processing apparatus according to the exemplary embodiment of the invention.

FIG. 8 is a graph representing the personalized ranking of each node calculated by the information processing apparatus 1 according to the exemplary embodiment of the invention. In the graph in FIG. 8, the horizontal axis represents node No., and the vertical axis represents personalized ranking p(n|I). The nodes [6] and [7] have a personalized ranking of 0.28 that is the highest value among the nodes. The node [5] has a personalized ranking of p(5|I)=0.18, and the node [4] has a personalized ranking of p(4|I)=0.11. The nodes [5] and [4] are ranked middle. The nodes [1] to [3] each have a low personalized ranking of 0.05. The total sum of these values is 1, that is, ($\Sigma_n p(n|I)=1$), and thus the personalized rankings are determined as relative rankings among the multiple nodes.

The information processing apparatus 1 according to the present exemplary embodiment is enabled to output a personalized ranking of a node in real time in response to a request from a user for whom the interest vector I 102 has been identified. For example, suppose a case where nodes represent document data. In response to input of a search string by the user for whom the interest vector I 102 has been identified, processing is performed in such a manner as to perform a search based on an index q(k|n) and to preferentially present a node having a high personalized ranking p(n|I), thus enabling a search to be performed on nodes in accordance with the user's interest. The information processing apparatus 1 according to the present exemplary embodiment does not have to in advance calculate the personalized rankings of the nodes, and thus enables the personalized rankings to be calculated after receiving the request from the user. This enables personalized rankings to be provided, with a situation change reflected more favorably than in the case where the personalized rankings is in advance calculated.

Figure 9:
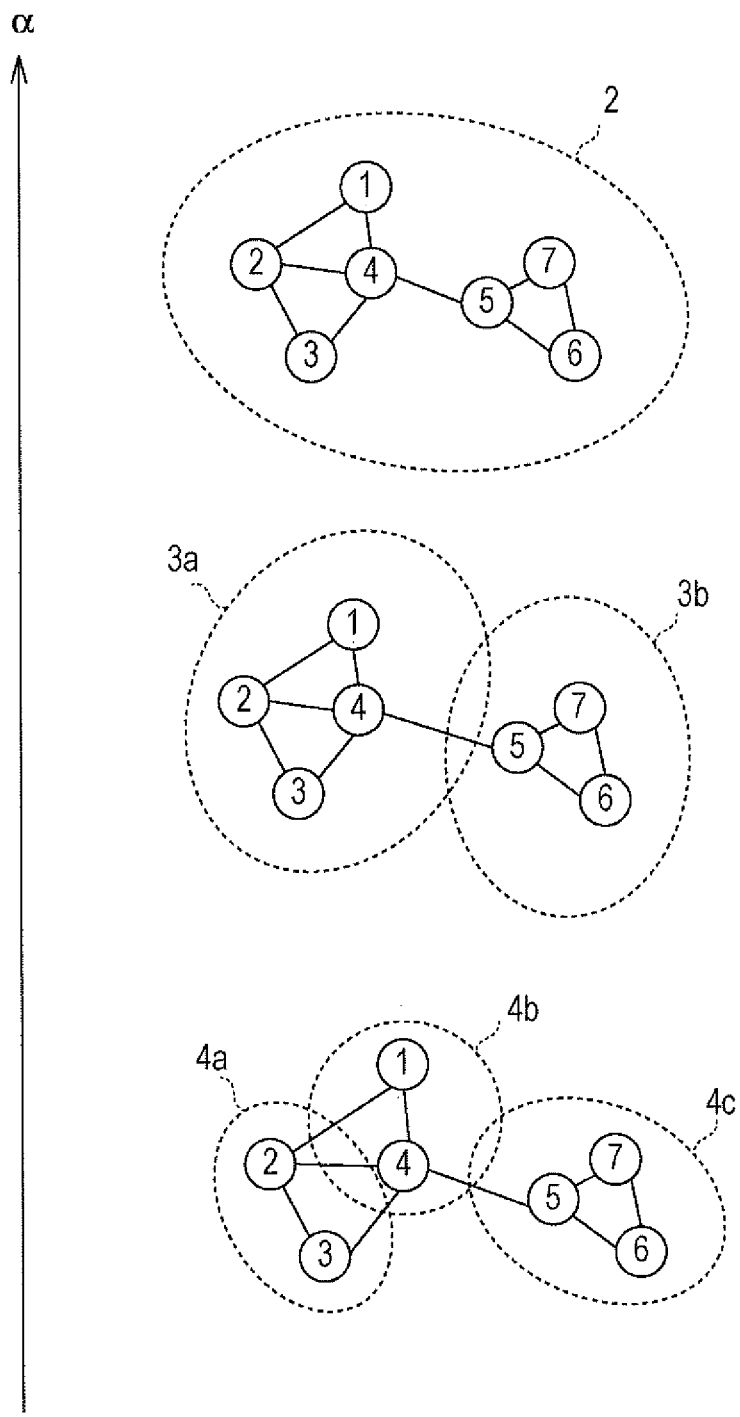
FIG. 9 is a diagram illustrating a relationship between the number of components and a granularity acquired by the information processing apparatus according to the exemplary embodiment of the invention.

FIG. 9 is a diagram illustrating a relationship between the number K of components and a granularity 101 acquired by the information processing apparatus 1 according to the exemplary embodiment of the invention. In the information processing apparatus 1 according to the present exemplary embodiment, the granularity 101 in the case of classifying nodes in the network into components is parameterized by using a positive real number $\alpha$. In the parameterization in the present exemplary embodiment, the larger $\alpha$ is, the coarser the classification granularity is. The smaller $\alpha$ is, the finer the classification granularity is. FIG. 9 does not accurately illustrate how the soft clustering is performed on the network and is provided to illustrate a relationship between the granularity 101 and the number K of components. In FIG. 9, broken-line ellipses represent components in the network, and each broken line surrounds a group of nodes having higher degrees of belonging to one of the components than to the other components.

A component 2 in a first example represents a component observed in a case where the granularity 101 is relatively coarse. In the first example, the granularity 101 is relatively coarse, and thus calculation results in a single component to which all the nodes in the network belong. In this case, the number of components having a degree of importance that is not 0 (that does not satisfy the degree of importance<the predetermined reference value $\epsilon$) is 1, and the total number of components is 1.

The broken-line ellipses represent components 3a and 3b in a second example that are calculated in the second example and that exhibit a finer granularity 101 than in the first example. Four nodes belong to the component 3a in the second example, and three nodes belong to the component 3b in the second example. Nodes [1] to [4] have relatively high degrees of belonging to the component 3a in the second example, and nodes [5] to [7] have relatively high degrees of belonging to the component 3b in the second example. Note that each node has degrees of belonging to the respective components, and the degrees of belonging might not be 0. In particular, nodes such as the nodes [4] and [5] each might have approximately the same degrees of belonging to two respective components. In the second example, calculation results in two components to which the nodes in the network belong. In this case, the number of components having a degree of importance that is not 0 is 2, and the total number of components is 2.

The broken-line ellipses represent components 4a, 4b, and 4c in a third example that are calculated in the third example and that exhibit a finer granularity 101 than in the second example. Two nodes belong to the components 4a and 4b in the third example, and three nodes belong to the component 4c in the third example. Nodes [2] and [3] have relatively high degrees of belonging to the component 4a in the third example. Nodes [1] and [4] have relatively high degrees of belonging to the component 4b in the third example. Nodes [5] to [7] have relatively high degrees of belonging to the component 4c in the third example. Since a small number of nodes belong to one component in the third example, the components are likely to overlap with each other. Accordingly, each node might have approximately the same degrees of belonging to respective components. In the third example, calculation results in three components to which the nodes in the network belong. In this case, the number of components having a degree of importance that is not 0 is 3, and the total number of components is 3.

As described above, a coarser granularity $\alpha$ 101 leads to a smaller number of found components in the information processing apparatus 1 according to the present exemplary embodiment. The user of the information processing apparatus 1 may use different granularities $\alpha$ 101 to perform soft clustering on the same network information 100 of a network and thus may discompose the network into various layers.

Hereinafter, the meaning of the classification proportion, the degree of importance, the granularity $\alpha$, the degree of belonging, and the personalized ranking in the present exemplary embodiment will be described based on the theoretical background. Suppose a case where a virtual agent randomly transitions in the network represented by the network information 100. In a case where a probability of finding the virtual agent in a node [n] is p(n), p(n) may be expressed as $p(n)=\Sigma_k p(n|k)p(k)$ by using a certain probability p(k) and a conditional probability p(n|k). In the present exemplary embodiment, the classification proportion p(n|k) in which the node [n] is classified as a component [k] is considered to be the conditional probability p(n|k), and the degree of importance $\pi$(k) of the component [k] is considered to be the probability p(k). The classification proportion p(n|k) and the degree of importance $\pi$(k) are also considered to be parameters $\theta$ that are to be set. The parameters $\theta$ are real numbers and the number of real numbers is (N+1)×K−2. The classification proportion p(n|k) is a probability at which the virtual agent is found in the node [n] in a case where the virtual agent is found in the component [k]. The degree of importance $\pi$(k) is a probability at which the virtual agent is found in the component [k].

Each parameter $\theta$ is determined under the condition that data x is obtained in observation of the network. In the present exemplary embodiment, the data x is the transit information $\tau_n^{(d)}$. The transit information $\tau_n^{(d)}$ represents which link the virtual agent is passing through in the d-th observation. The data x has N×D pieces of values of 0 and 1.

In the present exemplary embodiment, each parameter $\theta$ (the classification proportion and the degree of importance) is determined by maximizing a likelihood p(x|$\theta$) at which the data x (transit information) is obtained in a case where the parameter $\theta$ is assumed. In other words, a maximum likelihood estimation method is used in which the parameter $\theta$ is estimated by maximizing a likelihood function p(x|$\theta$).

In the present exemplary embodiment, maximum likelihood estimation is performed on the parameter $\theta$ by using an expectation-maximization (EM) algorithm. The maximum likelihood estimation thus uses a latent variable $z_k^{(d)}$ for satisfying $p(x|\theta)=\Sigma_z p(x, z|\theta)$. In the present exemplary embodiment, the latent variable $z_k^{(d)}$ is a vector with the same number of dimensions as the total number K of components. The latent variable $z_k^{(d)}$ is a unit vector that satisfies $z_k=1$ and the other elements=0 in a case where the virtual agent is located in the component [c]. The latent variable $z_k^{(d)}$ represents a variable obtained in the d-th trial. The latent variable z has K×D pieces of values of 0 and 1.

The EM algorithm determines the parameter θ by maximizing an evaluation value $Q=\Sigma_z p(z|x, \theta)\log(P(x, z|\theta))$ that facilitates calculation, instead of directly maximizing the likelihood function $p(x|\theta)$. Even though the evaluation value Q is maximized, instead of the likelihood function $p(x|\theta)$, the same result as in the case of maximizing the likelihood function $p(x|\theta)$ is obtained.

In the present exemplary embodiment, Formula (9) below is provided to assume each parameter θ (the classification proportion and the degree of importance). In other words, it is assumed that the parameter θ is subject to probability distribution expressed by Formula (9). This means that prior probability distribution of the parameter θ is assumed to be Dirichlet distribution.

$$P(\theta) \propto \prod_{n=1}^{N} (p_t(n|k))^{\alpha \Sigma_{m=1}^{N} T_{nm} p_{t-1}(m|k)} \quad (9)$$

Note that $p_t(n|k)$ and $p_{t-1}(m|k)$ are each a classification proportion in the sequential computation in the decomposition process, α is the granularity 101, and $T_{nm}$ is a transition probability determined from the structure of the network information 100.

The probability distribution p(θ) to which the parameter θ is subject may also be considered to represent a probability $P(p_t(n|k)|p_{t-1}(n|k))$ of a transition from $p_{t-1}(n|k)$ to $p_t(n|k)$. At a limit of $\alpha \to \infty$, $P(p_t(n|k)|p_{t-1}(n|k)) \to \delta(p_t(n|k) - \Sigma_m T_{nm} p_{t-1}(m|k))$ holds true. Note that δ represents a so-called delta function. Specifically, as the granularity 101 becomes coarser, a relation describing development of $p_t(n|k)$ in the sequential computation asymptotically approaches a relation $p_t(n|k)=\Sigma_m T_{nm} p_{t-1}(m|k)$ that holds true in a case of random transitions in the network. In the present exemplary embodiment, it may be said that α is a parameter representing a deviation from the relation $p_t(n|k)=\Sigma_m T_{nm} p_{t-1}(m|k)$. As α approaches 0, the deviation from the deterministic relation $p_t(n|k)=\Sigma_m T_{nm} p_{t-1}(m|k)$ becomes larger.

In the EM algorithm, the evaluation value $Q_t$ in Formula (6) is partially differentiated by using $p_t(n|k)$ and $\pi_t(k)$ that are the parameters θ, and the parameters θ leading to the maximum value of the evaluation value $Q_t$ are thereby determined. This results in Formula (3) regarding the classification proportion $p_t(n|k)$ and Formula (5) regarding the degree of importance $\pi_t(k)$. Thereafter, if an absolute value of a difference in maximum value between the evaluation value $Q_t$ and the evaluation value $Q_{t-1}$ becomes lower than the predetermined reference value ε, the sequential computation is terminated, and p(n|k) and π(k) are determined.

In a case where the evaluation value is maximized, constraints that are $\Sigma_n p_t(n|k)=1$ and $\Sigma_k \pi_t(k)=1$ are required to be considered. The constraints may be included in a list of the evaluation values Q by using Lagrange's method of undetermined multiplier, or calculations may be performed with the constraints being released, that is, for example, with $p_t(n=N|k)$ being defined as $p_t(n=N|k)=1-p_t(n=1|k)-p_t(n=2|k) \ldots -p_t(n=N-1|k)$.

The degree of belonging q(k|n) is obtained in accordance with Formula (7). Formula (7) is a relation known as Bayes' theorem, and the degree of belonging q(k|n) is equivalent to a conditional probability p(k|n). The degree of belonging q(k|n) represents a probability at which the virtual agent belongs to the component [k] in a case where the virtual agent is found in the node [n].

A personalized ranking p(n|I) is a conditional probability and obtained in accordance with Formula (8). The personalized ranking p(n|I) represents a probability at which the virtual agent is found in the node [n] under the condition that an interest vector I of a user is provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an acquiring unit that acquires a granularity and network information that includes a plurality of nodes and a plurality of links connecting the plurality of nodes, the granularity being used to classify the plurality of nodes into a plurality of components; and
   a classification-proportion calculating unit that calculates a classification proportion in which each of the plurality of nodes is classified as one of the components, the classification-proportion calculating unit calculating the classification proportion for each of the plurality of components by using values of a first contribution and a second contribution, the first contribution taking on a high value as the classification proportion becomes high in which one of the nodes having a corresponding one of the links is classified as the component, the second contribution taking on a high value as a proportion of the component to the plurality of components becomes high.

2. The information processing apparatus according to claim 1, further comprising:
   a degree-of-belonging calculating unit that calculates, for each of the plurality of nodes, a degree of belonging of the node to each of the plurality of components such that the degree of belonging takes on a high value as the classification proportion becomes high in which the node is classified as the component.

3. The information processing apparatus according to claim 2, further comprising;
   a degree-of-importance calculating unit that calculates, for each of the plurality of components, a degree of importance of the component such that the degree of importance takes on a high value as the proportion of the component to the plurality of components becomes high,
   wherein the degree-of-belonging calculating unit calculates, for each of the plurality of nodes, the degree of belonging of the node to each of the plurality of components such that the degree of belonging takes on a high value as the degree of importance of the component becomes high.

4. The information processing apparatus according to claim 3,
wherein the acquiring unit further acquires, for each of the plurality of nodes, a value representing how much a user is interested in the node,
the information processing apparatus further comprising
a personalized-ranking calculating unit that calculates a personalized ranking based on the value for each of the plurality of nodes with respect to one of the components to which one of the nodes that has a relatively high value belongs, the component exhibiting a relatively high degree of belonging, the personalized-ranking calculating unit calculating the personalized ranking such that one of the nodes that has a higher degree of belonging to the component than other nodes is ranked higher.

5. The information processing apparatus according to claim 1,
wherein the classification-proportion calculating unit and a degree-of-importance calculating unit calculate the classification proportion and a degree of importance, respectively, in sequential computation,
wherein the first contribution is determined from a first coefficient and a preceding classification proportion calculated for the one of the nodes having the corresponding one of the links, the first coefficient approaching 1 as the granularity is made coarser, and
wherein the second contribution is determined from a second coefficient, a plurality of pieces of transit information, and the proportion of the component to the plurality of components, the second coefficient approaching 0 as the granularity is made coarser, the plurality of pieces of transit information indicating nodes passed through in a case of random transitions between the plurality of nodes through the plurality of links, the proportion of the component to the plurality of components being calculated from the preceding calculated classification proportion and a preceding calculated degree of importance.

6. The information processing apparatus according to claim 5,
wherein in a case where
n denotes one of the plurality of nodes, k denotes one of the plurality of components, $p_{t-1}(n|k)$ denotes the preceding calculated classification proportion among the classification proportions in which a node n is classified as a component k, α denotes the granularity, $T_{nm}$ denotes information regarding a link connecting the node n and a node m, $\tau_n^{(d)}$ denotes the plurality of pieces of transit information indicating transit through the node n, and $\pi_{t-1}(k)$ denotes the preceding calculated degree of importance among the degrees of importance of the component k,
where a proportion $\gamma_t^{(d)}(k)$ of the component k to the plurality of components is calculated from the preceding calculated classification proportion $p_{t-1}(n|k)$, the degree of importance $\pi_{t-1}(k)$, and the plurality of pieces of transit information $\tau_n^{(d)}$ and is determined in accordance with $\gamma_t^{(d)}(k) = \pi_{t-1}(k)\Pi_n(p_{t-1}(n|k))^{\tau n(d)}/\Sigma_j(\pi_{t-1}(j)\Pi_m(p_{t-1}(m|j))^{\tau m(d)})$, and
where $D_{t-1}(k) = \Sigma_d \gamma_{t-1}^{(d)}(k)$ is determined,
the classification-proportion calculating unit performs the sequential computation to obtain the classification proportion in accordance with a relation $p_t(n|k) = \alpha\Sigma_m T_{nm} p_{t-1}(m|k)/(\alpha+2D_{t-1}(k)) + \Sigma_d \gamma_{t-1}^{(d)}(k)\tau_n^{(d)}/(\alpha+2D_{t-1}(k))$, and the degree-of-importance calculating unit performs the sequential computation to obtain the degree of importance in accordance with a relation $\pi_t(k) = D_{t-1}(k)/\Sigma_j D_{t-1}(j)$, and wherein in a case where a determination value $Q_t$ determined in accordance with $Q_t = \Sigma_k \Sigma_d \gamma_t^{(d)}(k)\log(\pi_t(k)) + \Sigma_k \Sigma_n (\Sigma_d \gamma_t^{(d)}(k)\tau_n^{(d)} + \alpha\Sigma_m T_{nm} p_t(m|k))\log(p_t(n|k))$ satisfies a relation with a predetermined value ε

$|Q_t - Q_{t-1}| < \epsilon$, the degree-of-importance calculating unit determines the classification proportion in which the node n is classified as the component k to be $p(n|k) = p_t(n|k)$ and the degree of importance of the component k to be $\pi(k) = \pi_t(k)$.

7. The information processing apparatus according to claim 6,
wherein in a case where q(k|n) denotes a degree of belonging of the node n to the component k,
a degree-of-belonging calculating unit calculates the degree of belonging in accordance with a relation $q(k|n) = \pi(k)p(n|k)/(\Sigma_j \pi(j)p(n|j))$.

8. The information processing apparatus according to claim 7,
wherein in a case where $I_n$ denotes a value representing how much a user is interested in the node n, and where p(n|I) denotes a personalized ranking of the node n calculated for the user,
a personalized-ranking calculating unit calculates the personalized ranking in accordance with a relation $p(n|I) = \Sigma_k p(n|k)\Pi_m(q(k|m))^{Im}/(\Sigma_j \Pi_r(q(j|r))^{Ir})$.

9. A non-transitory computer readable medium storing a program causing a computer to execute a process comprising:
acquiring a granularity and network information that includes a plurality of nodes and a plurality of links connecting the plurality of nodes, the granularity being used to classify the plurality of nodes into a plurality of components; and
calculating a classification proportion in which each of the plurality of nodes is classified as one of the components, the classification proportion being calculated for each of the plurality of components by using values of a first contribution and a second contribution, the first contribution taking on a high value as the classification proportion becomes high in which one of the nodes having a corresponding one of the links is classified as the component, the second contribution taking on a high value as a proportion of the component to the plurality of components becomes high.

10. An information processing method comprising:
acquiring a granularity and network information that includes a plurality of nodes and a plurality of links connecting the plurality of nodes, the granularity being used to classify the plurality of nodes into a plurality of components; and
calculating a classification proportion in which each of the plurality of nodes is classified as one of the components, the classification proportion being calculated for each of the plurality of components by using values of a first contribution and a second contribution, the first contribution taking on a high value as the classification proportion becomes high in which one of the nodes having a corresponding one of the links is classified as the component, the second contribution taking on a high value as a proportion of the component to the plurality of components becomes high.

* * * * *